United States Patent
Lerner et al.

(10) Patent No.: US 8,642,223 B2
(45) Date of Patent: Feb. 4, 2014

(54) CONTROL STRATEGY TO PREVENT UNEXPECTED HYDROGEN FLOW TO THE CATHODE DUE TO A FAILED PRESSURE SENSOR WHILE CATALYTIC HEATING

(75) Inventors: Seth E. Lerner, Honeoye Falls, NY (US); Steven R. Falta, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 433 days.

(21) Appl. No.: 13/160,276

(22) Filed: Jun. 14, 2011

(65) Prior Publication Data

US 2012/0321979 A1    Dec. 20, 2012

(51) Int. Cl.
*H01M 8/04* (2006.01)

(52) U.S. Cl.
USPC .......................................... 429/441

(58) Field of Classification Search
USPC .......................................... 429/441
See application file for complete search history.

(56) References Cited

U.S. PATENT DOCUMENTS 6,849,352 B2 *   2/2005   Formanski et al. ............ 429/415
7,846,601 B2    12/2010   Skala
8,409,762 B2 *   4/2013   Frost et al. .................... 429/444

OTHER PUBLICATIONS

Falta Steven R. "Injector Flow Measurement for Fuel Cell Applications" U.S. Appl. No. 12/636,276, filed Dec. 11, 2009.

* cited by examiner

*Primary Examiner* — Patrick Ryan
*Assistant Examiner* — Lucas J O'Donnell
(74) *Attorney, Agent, or Firm* — John A. Miller; Miller IP Group, PLC

(57) ABSTRACT

A method for determining a flow of a gas through an injector and a flow of a gas through a valve in a fuel cell system. The method includes determining an injector flow estimation for the gas flowing through the injector and determining a valve flow estimation for the gas flowing through the valve. The method also includes calculating an error that is a difference between the injector flow estimation and the valve flow estimation and adjusting the flow of the gas through the valve based on the error.

18 Claims, 3 Drawing Sheets

CONTROL STRATEGY TO PREVENT UNEXPECTED HYDROGEN FLOW TO THE CATHODE DUE TO A FAILED PRESSURE SENSOR WHILE CATALYTIC HEATING

BACKGROUND OF THE INVENTION

1. Field of the Invention

This invention relates generally to a method for preventing unexpected hydrogen flow to a cathode side of a fuel cell stack and, more particularly, to a method for preventing unexpected hydrogen flow to a cathode side of a fuel cell stack during catalytic heating by limiting hydrogen flow to the cathode side until a determination of the accuracy of a valve flow estimation can be made.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be slightly higher than the cathode side pressure, cathode side partial pressures will cause oxygen and nitrogen to permeate through the membrane. The permeated oxygen reacts in the presence of the anode catalyst, but the permeated nitrogen in the anode side of the fuel cell stack dilutes the hydrogen. If the nitrogen concentration increases above a certain percentage, such as 50%, the fuel cell stack may become unstable and may fail.

It is known in the art to provide a bleed valve at the anode exhaust gas output of the fuel cell stack to remove nitrogen from the anode side of the stack. It is also known in the art to estimate the molar fraction of nitrogen in the anode side using a model to determine when to perform the bleed of the anode side or anode sub-system. However, the model estimation may contain errors, particularly as degradation of the components of the fuel cell system occurs over time. If the anode nitrogen molar fraction estimation is significantly higher than the actual nitrogen molar fraction, the fuel cell system will vent more anode gas than is necessary, i.e., will waste fuel. If the anode nitrogen molar fraction estimation is significantly lower than the actual nitrogen molar fraction, the system will not vent enough anode gas and may starve the fuel cells of reactants, which may damage the electrodes in the fuel cell stack.

In a fuel cell system, hydrogen can be introduced into the air inlet to react in the cathode side of a fuel cell stack for the purpose of producing heat. Typically, this is done by flowing hydrogen from the anode directly into the cathode inlet through a valve with a known orifice size. To control the amount of heat generated, the hydrogen flow must be accurately controlled. Thus, there is a need in the art for ensuring that unexpected hydrogen flow does not occur when flowing hydrogen from the anode directly into the cathode inlet.

SUMMARY OF THE INVENTION

The present invention discloses a method for determining a flow of a gas through an injector and a flow of a gas through a valve in a fuel cell system. The method includes determining an injector flow estimation for the gas flowing through the injector and determining a valve flow estimation for the gas flowing through the valve. The method also includes calculating an error that is a difference between the injector flow estimation and the valve flow estimation and adjusting the flow of the gas through the valve based on the error.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for preventing unexpected hydrogen flow to a cathode side of a fuel cell stack is merely exemplary in nature, and is in no way intended to limit the invention or its applications or uses.

Figure 1:
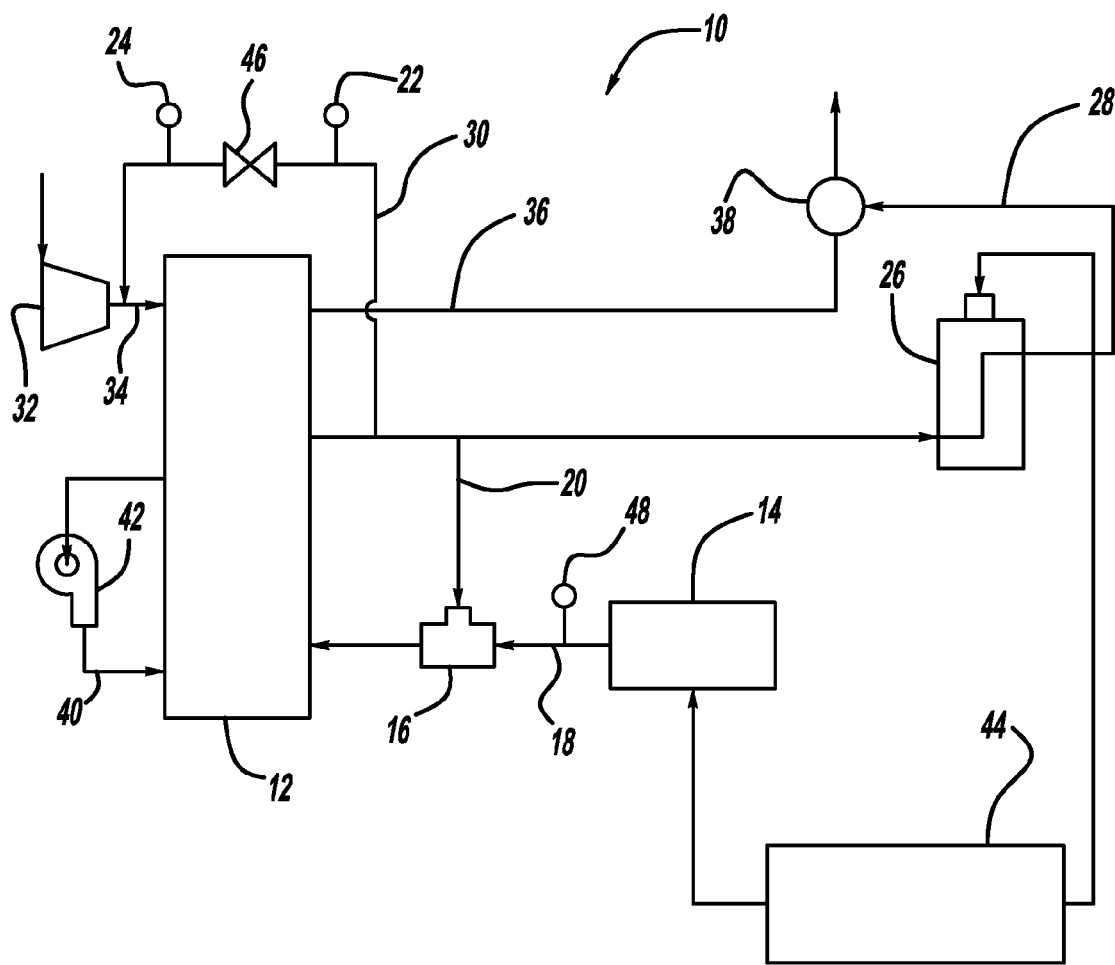
FIG. 1 is a simplified block diagram of a fuel cell system.

FIG. 1 is a simplified block diagram of a fuel cell system 10 including a fuel cell stack 12. Hydrogen gas from a hydrogen source 14 is provided to the anode side of the fuel cell stack 12 on an anode input line 18 by an injector 16, such as by an injector/ejector, as described in U.S. Pat. No. 7,320,840 entitled, "Combination of Injector-Ejector for Fuel Cell Systems," issued Jan. 22, 2008, assigned to the assignee of this application and incorporated herein by reference. A pressure sensor 48 is included in the anode input line 18 to measure the pressure of the hydrogen supplied to the injector 16. An anode effluent gas provided at an output of the anode side of the stack 12 is routed back into the fuel cell stack 12 on an anode recirculation line 20. The anode input line 18, the injector 16, the anode side of the stack 12 and the anode recirculation line 20 are all components that make up an "anode subsystem," and the anode input line 18 and the anode recirculation line 20 make up an "anode loop" as is known to those skilled in the art.

Nitrogen cross-over from the cathode side of the fuel cell stack 12 dilutes the hydrogen in the anode side of the stack 12, thereby affecting fuel cell stack performance. Therefore, it is necessary to periodically bleed the anode effluent gas from the anode sub-system using a bleed valve 26 to reduce the amount of nitrogen in the anode sub-system, i.e., in the anode side of the fuel cell stack 12. When the bleed valve 26 is open, the bled anode exhaust gas flows through a bleed line 28.

Air from a compressor 32 is provided to the cathode side of the fuel cell stack 12 on line 34. A cathode gas is output from the fuel cell stack 12 on a cathode gas line 36. The line 34, the cathode side of the stack 12 and the cathode gas line 36 are all part of a "cathode subsystem." A mixing device 38 is provided in the line 36 for mixing the cathode gas from the stack 12 and the bled anode exhaust gas from the line 28. A line 30 provides hydrogen from the anode loop to the cathode inlet line 34. A valve 46 is provided in the line 30 to control the flow of hydrogen from the anode loop to the cathode inlet line 34, as is discussed in more detail below. The line 30 also includes a pressure sensor 22 upstream of the valve 46 and a pressure sensor 24 downstream of the valve 46 that are used to control the pressure in the anode subsystem and the cathode subsystem such that a desired flow can be achieved through the valve 46, as is described in more detail below.

A pump 42 pumps a coolant through the stack 12 and a coolant line 40 that is outside of the stack 12. Although not shown for the sake of clarity, a radiator and/or a heat exchanger can be included in the coolant line 40 to maintain the fuel cell stack 12 at the desired temperature.

A controller 44 monitors and controls the temperature and pressure of the anode subsystem and the cathode subsystem of the fuel cell system 10, controls the speed of the compressor 32, controls the injection of hydrogen from the injector 16 to the anode side of the stack 12, and controls the position of the anode bleed valve 26 and the valve 46, as is discussed in more detail below.

The pressure in the anode loop including the line 30 up to the valve 46 is monitored by the pressure sensor 22, which is the "high side pressure" because the anode subsystem is maintained at a higher pressure than the cathode subsystem, as is known to those skilled in the art. The pressure of the hydrogen in the line 30 that is downstream of the valve 46 is monitored by the pressure sensor 24 when the valve 46 is opened, which is the "low side pressure," as discussed in more detail below. The orifice size of the valve 46 is known, thus, using the following equation, the molar flow rate of hydrogen for subsonic flow may be determined.

$$\dot{n}_{SubSonic} = \frac{P_{AnIn} \cdot A_{V_{lv}}}{\sqrt{MW_{AnOut}}} \sqrt{\left(\frac{2}{R(T_{coolIn})}\right)\left(\frac{k}{k-1}\right)\left[\left(\frac{P_{CaIn}}{P_{AnIn}}\right)^{2/k} - \left(\frac{P_{CaIn}}{P_{AnIn}}\right)^{k+1/k}\right]} \quad (1)$$

Where $\dot{n}_{SubSonic}$ is the molar flow rate of hydrogen for subsonic flow, $P_{AnIn}$ is the pressure in the anode loop in kPa, i.e., the anode high side pressure, $A_{V_{lv}}$ is the cross-sectional area of the valve 46, $MW_{AnOut}$ is the molecular weight of the anode outlet gas (an equivalent that may be used for this term is the $k_v$ of the valve), R is the ideal gas constant (approximately 8.3144 kPa·L·mol$^{-1}$·K$^{-1}$), $T_{coolIn}$ is the temperature of the coolant at a coolant inlet to the fuel cell stack 12, k is the ratio of specific volume over specific heat (for hydrogen this value is 1.4), $P_{CaIn}$ is the pressure of the cathode inlet as measured by the pressure sensor 24 in kPa, also known as the low side pressure.

From equation (1) it can be seen that by controlling the anode high side pressure a desired flow can be achieved given that the low side pressure is known. If a change to the low side pressure occurs, the controller 44 adjusts the anode high side pressure accordingly to maintain a desired flow.

Should one of the pressure sensors 22 or 24 fail such that it reads a higher or lower value than the actual pressure, a flow estimation of the hydrogen flowing through the valve 46, using equation (1) above, will incorrectly estimate the flow of hydrogen through the line 30 and the valve 46 to the cathode inlet line 34. The actual flow of hydrogen to the cathode inlet line 34 may be higher or lower than the desired flow. If the actual flow of hydrogen to the cathode inlet line 34 is higher than expected, the excess flow of hydrogen to the cathode inlet line 34 may "slip," i.e., pass through the cathode side of the stack 12 and exit the fuel cell system 10 through the cathode exhaust line 36. This may cause the cathode exhaust gas hydrogen concentration to exceed the maximum allowable limit.

Thus, to ensure that the valve flow estimation is accurate, the valve flow estimation may be compared to an injector flow estimation that calculates the flow of hydrogen into the anode subsystem through the injector 16. The flow of hydrogen through the injector 16 can be determined using the following equation:

$$\dot{n}_{InjSonic} = \frac{P_{AnInSply} \cdot A_{Inj} \cdot k_{InjAdptFx}}{\sqrt{MW_{Fuel}}} \sqrt{\left(\frac{k}{R \cdot (T_{Sply})}\right)\left(\frac{2}{k+1}\right)^{\frac{k+1}{k-1}}} \quad (2)$$

Where $\dot{n}_{InjSonic}$ is the molar flow rate of hydrogen through the injector for subsonic flow, $P_{AnInSply}$ is the pressure of the anode input line 18 upstream of the injector 16, $k_{Inj}$ is the cross-sectional area of the injector 16, $k_{InjAdptFx}$ is an adaptation factor to account for part to part variation and other unknowns of the injector 16, $MW_{Fuel}$ is the molecular weight of the hydrogen fuel, k is the ratio of specific volume over specific heat (for hydrogen this value is 1.4), R is the ideal gas constant (approximately 8.3144 kPa·L·mol$^{-1}$·K$^{-1}$), $T_{Sply}$ is the temperature of the hydrogen in the input line 18 upstream of the injector 16.

The amount of hydrogen that is injected into the anode subsystem less the amount of hydrogen consumed by the fuel cell reaction in the stack 12 is the estimated amount of hydrogen flow that is expected to flow through the valve 46 on the line 30. Other factors, such as hydrogen cross-over losses and hydrogen leak rates should be included in the estimated amount of hydrogen flow to ensure an accurate estimation of the amount of hydrogen flow that is expected to flow through the valve 46.

The injector flow model of equation (2) can only be compared to the valve flow model of equation (1), when the valve 46 is open and hydrogen is flowing through the valve 46. The problem that is encountered when comparing the injector flow model of equation (2) to the valve flow model of equation (1) is that the diagnosis of the problem occurs after the problem has already occurred. Thus, should the cathode pressure sensor 24 read higher than the actual pressure and the valve 46 is commanded open to flow hydrogen to the cathode side of the stack 12 on the line 30, hydrogen flow through the line 30 will be higher than desired. Thus, the concern is that this can only be calculated after the valve 46 is opened and too much hydrogen flow through the line 30 occurs. In other words, and as stated above, the problem is not detected until it is too late.

To address the problem of not being able to run a hydrogen flow diagnostic or a pressure sensor diagnostic until flow through the line 30 occurs, the operating conditions of the fuel cell system 10 are adjusted before allowing the desired flow of hydrogen through the valve 46 on the line 30. Because the desired flow rate is based on the amount of desired heat generation, the pressure in the anode subsystem will be adjusted to a pressure that will meet the desired flow rate once the request for catalytic heating occurs. The request for catalytic heating typically occurs before the valve open request for the valve 46 occurs. Thus, to prevent undesired hydrogen flow to the cathode side of the stack 12 on the line 30 due to a faulty pressure reading from the cathode side pressure sensor 24, the low side pressure, a method to reduce the anode pressure of the anode subsystem to a safe value or nominal value prior to opening the valve 46 is needed.

According to the method of the present invention, after the valve 46 is opened and the flow estimation is confirmed to be accurate, as is discussed in more detail below, the hydrogen flow rate through the valve 46 may be ramped up from a conservative flow rate to the desired rate for cathode catalytic heating by increasing the anode side pressure such that the desired flow rate to achieve cathode catalytic heating of the fuel cell stack 12 is achieved. The safe value or nominal value of initial hydrogen flow, discussed above, could be based on a minimum allowable value for an anode side and cathode side pressure bias that is based on, for example, the amount of cathode air flow available to dilute the hydrogen being added to the cathode subsystem. Thus, the method of keeping the initial hydrogen flow to a safe value or a nominal value until the valve flow estimation of the valve 46 is determined to be accurate will allow enough time for the diagnostic to perform a check without risking undesirably high flow of hydrogen to the cathode side of the stack 12 on the line 30, which may pose the risk of an exhaust hydrogen violation from the fuel cell system 10.

Figure 2:
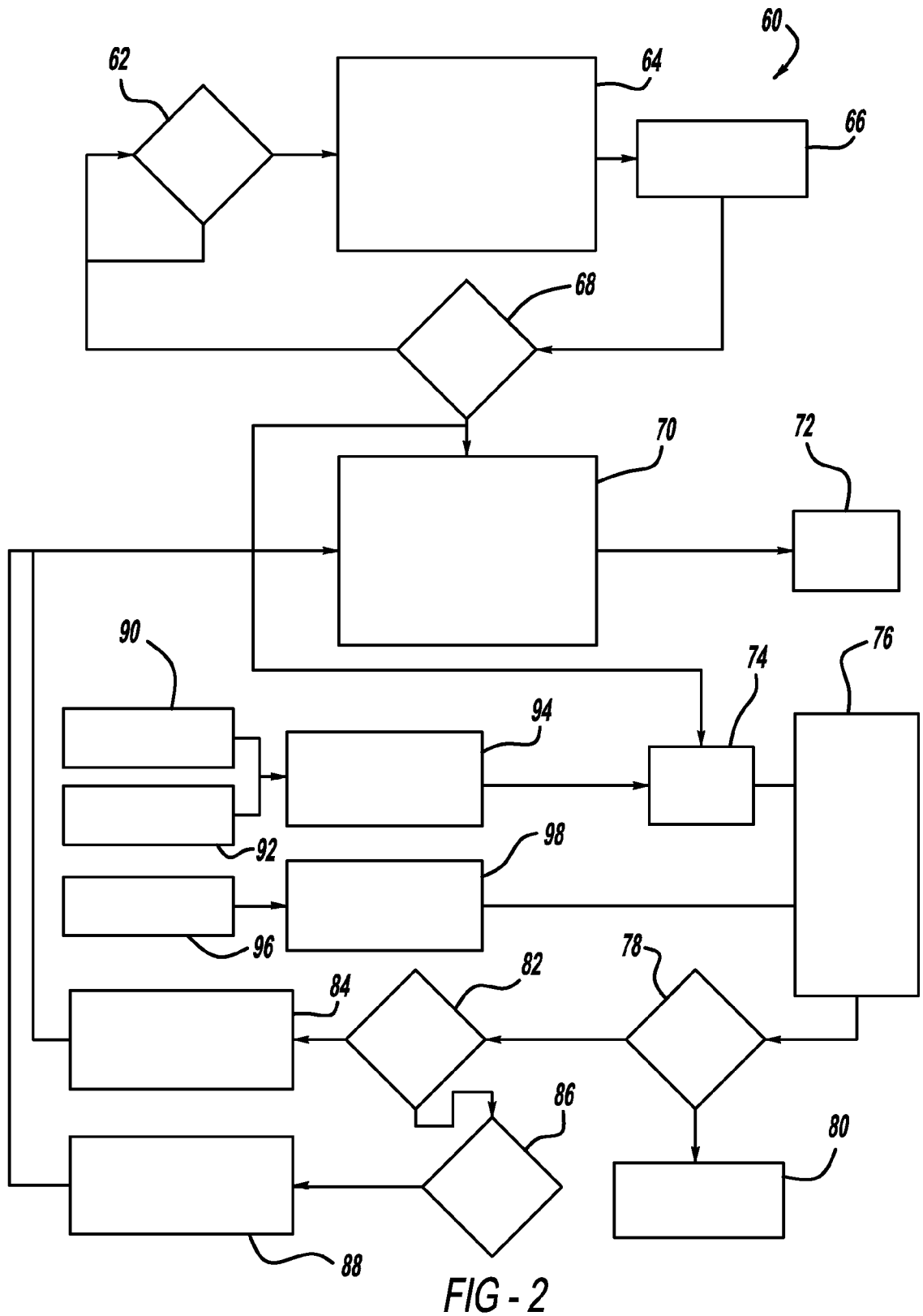
FIG. 2 is a flow chart diagram of an algorithm for limiting hydrogen flow through a valve until a valve flow estimation is determined to be accurate.

FIG. 2 is a flow diagram 60 of an algorithm for limiting hydrogen flow through the valve 46 until a valve flow estimation of the valve 46 is determined to be accurate. The algorithm begins when a cathode catalytic heating request is received at a decision diamond 62. Once the cathode catalytic heating request is received at the decision diamond 62, the amount of heating that is required is chosen at box 64. The amount of required heating that is chosen at the box 64 is based on factors such as initial stack temperature and instantaneous stack temperature, as described in U.S. Pat. No. 7,846,601 entitled, "Fuel Cell Design and Control Method to Facilitate Self Heating Through Catalytic Combustion of Anode Exhaust," issued Dec. 7, 2010, assigned to the assignee of this application and incorporated herein by reference.

Once the amount of heating required is determined at the box 64, the amount of hydrogen flow that is required is calculated at box 66. The calculated value for the amount of hydrogen flow that is required at the box 66 may be a value that provides for hydrogen slip and target cathode inlet hydrogen concentration, which may increase or limit the requested heating target.

Next, the algorithm determines if the valve 46 opened at decision diamond 68. If the algorithm determines that the valve 46 did open at the decision diamond 68, a ramp schedule is applied to the targeted flow request at box 70. The ramp schedule that is applied can be in terms of a percentage of the cathode catalytic heating target against time, and the total time needed to ramp up from 0% to 100% of the hydrogen needed to achieve the cathode catalytic heating target typically would be in the range of seconds. To ensure that flow reversal does not occur, i.e., to ensure that cathode air flow does not enter the anode subsystem of the stack 12 on the line 30, a minimum allowed anode subsystem to cathode subsystem pressure bias must be maintained by a pressure controller, such as the controller 44, at box 72. The minimum pressure biased used by the algorithm at the pressure controller box 72 coincides with a low percentage of the target flow required for heating, thus the lower percentage of the ramp schedule, i.e., the beginning of the ramp schedule is fixed so that it does not drop below a certain flow value to ensure a minimum anode subsystem to cathode subsystem pressure bias is maintained such that cathode air does not flow into the anode side of the stack 12 on the line 30 when the valve 46 is opened.

Once the valve 46 is opened, as determined by the decision diamond 68, and the ramp schedule beings at the box 70, the valve flow model will become valid as indicated by an enable box 74. An anode pressure sensor input 90 from the pressure sensor 22 and a cathode inlet pressure sensor 92 from the pressure sensor 24 are inputted into a valve flow model calculation box 94 that estimates the flow of hydrogen to the cathode line 34 in moles per second. The calculated valve flow model is then inputted into the enable box 74.

Anytime the injector 16 is flowing hydrogen to the anode subsystem, the algorithm will determine the amount of flow required as described in equation (2). Typically, the anode pressure will increase to meet the requested cathode catalytic hydrogen flow prior to the opening of the valve 46 based on the estimated flow through the valve 46, as if the valve 46 were open. The valve 46 is then opened shortly thereafter. The calculation of equation (1) uses both the anode side pressure measured by the pressure sensor 22 and the cathode side pressure measured by the pressure sensor 24 as pressure feedback to determine the pressure drop across the valve 46, using the known orifice size of the orifice 46, as discussed above. As is also discussed above, simply using equation (1) to determine the pressure drop across the valve 46 may lead to situations such as reduced heating rate or excessive hydrogen to the cathode inlet line 34 if the valve flow model is inaccurate. The valve flow model will be inaccurate if one or both of the sensors 22 and 24 are reporting an incorrect pressure reading to the controller 44, because the actual flow will not match the expected flow once the valve 46 opens. According to the present algorithm, the valve 46 is opened with a minimal flow rate set point for hydrogen flow before increasing to the desired hydrogen flow rate to the target rate to ensure that the flow through the valve 46 is accurate so as to prevent unintentionally allowing too much hydrogen to flow to the cathode line 34.

Once the ramp schedule is set at the box 70 and the valve flow model has become valid at the enable box 74, the algorithm will determine the expected amount of hydrogen flow through the valve 46 using feedback from the pressure sensors 22 and 24 and equation (1) as discussed above, and compare equation (1) to the injector based model of equation (2) at a comparator box 76. An anode supply pressure sensor input 96 from the pressure sensor 48 is inputted into a valve flow model based on injector estimation box 98 that estimates the amount of hydrogen flow to the cathode line 34 in moles per using equation (2) discussed above. The calculation from the valve flow model based on injector estimation box 98 is then inputted into the comparator box 76 as stated above.

To ensure accuracy of the comparison, the algorithm performs the comparison at the comparator box 76 when the hydrogen request is at a constant value, i.e., during a plateau in the ramp schedule, as is discussed in more detail below.

It should be noted that this algorithm does not decipher if the anode side pressure sensor 22 or the cathode side pressure sensor 24 has failed. The algorithm determines the error between the valve flow calculation of equation (1) and the injector model of equation (2) at decision diamond 78. If the algorithm determines that the error between the valve flow calculation and the injector model is zero or below a predetermined threshold at the decision diamond 78, the algorithm ends at box 80 and the ramp schedule to the target flow at the box is carried out to fulfill the cathode catalytic heating request.

If the algorithm determines that the error between the valve flow calculation of equation (1) and the injector model of equation (2) is above a predetermined threshold at the decision diamond 78, the algorithm determines if the hydrogen flow is higher than expected at decision diamond 82. If the hydrogen flow is higher than expected at the decision diamond 82, the algorithm will limit the maximum flow of hydrogen to compensate for the error, i.e., the higher than expected flow, at box 84. Once the algorithm has limited the maximum flow of hydrogen at the box 84, the algorithm will alter the ramp schedule at the box 70, and the adjusted value for the desired hydrogen flow set point will be set by the controller 44 at the pressure controller box 72.

If the flow of hydrogen is not higher than expected at the decision diamond 82, the algorithm determines if the flow of hydrogen is lower than expected at decision diamond 86. If the algorithm determines that the flow of hydrogen is lower than expected at the decision diamond 86, the algorithm increases the target flow of hydrogen to compensate for the error, i.e., to compensate for the lower than expected flow, at box 88. Once the algorithm has increased the maximum flow of hydrogen at the box 88, the algorithm will alter the ramp schedule at the box 70 and the adjusted value for the desired hydrogen flow set point will be set by the controller 44 at the pressure controller box 72. In this way, cathode catalytic heating requests can be fulfilled without the risk of flowing too much or too little hydrogen through the valve 46 to the cathode line 34.

Figure 3:
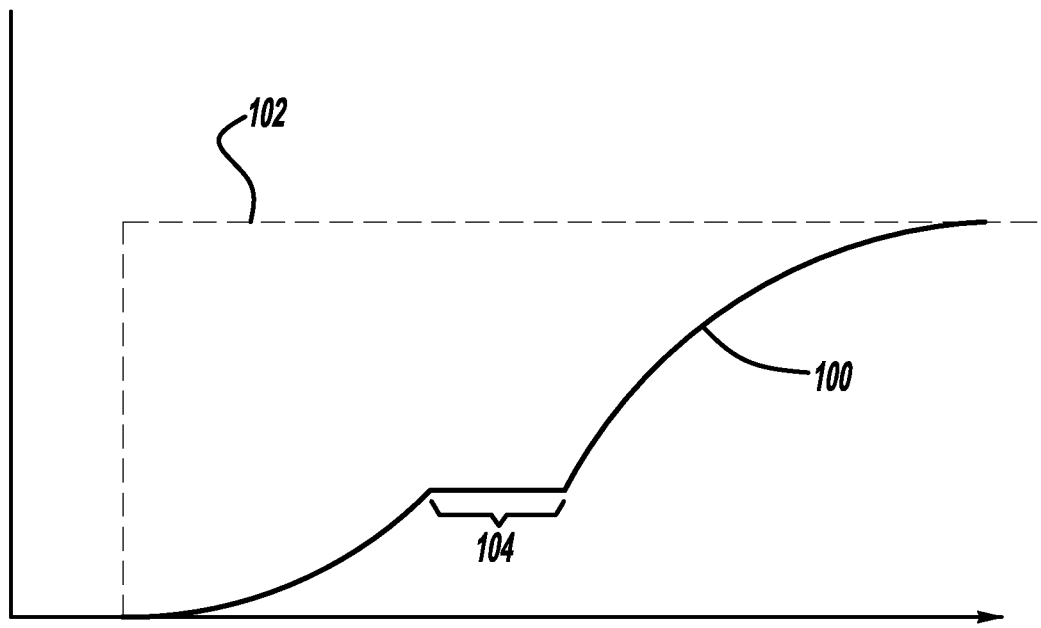
FIG. 3 is a graph with time on the x-axis and cathode catalytic heating flow on the y-axis illustrating a ramp schedule for hydrogen flow based on the determination of unexpected hydrogen flow.

FIG. 3 is a graph with time on the x-axis and cathode catalytic hydrogen flow on the y-axis. FIG. 3 illustrates a line 100 that represents the ramp schedule for hydrogen flow that corresponds to the box 70 of the algorithm 60 discussed above. Line 102 represents previous methods for implementing a cathode catalytic heating request. In the past, when a cathode catalytic heating request or a valve open request for the valve 46 was received, the full amount of hydrogen needed to fulfill the request was provided. According to the algorithm 60 discussed above, a portion of the desired hydrogen flow is provided, and when the amount of hydrogen being provided is constant, as shown in region 104, the algorithm 60 determines if the valve flow estimation of equation (1) is in an expected range. In the example of FIG. 3, the flow comparison is within range and the flow of hydrogen is allowed to ramp to the targeted flow request set at the box 70 of the algorithm 60.

Figure 4:
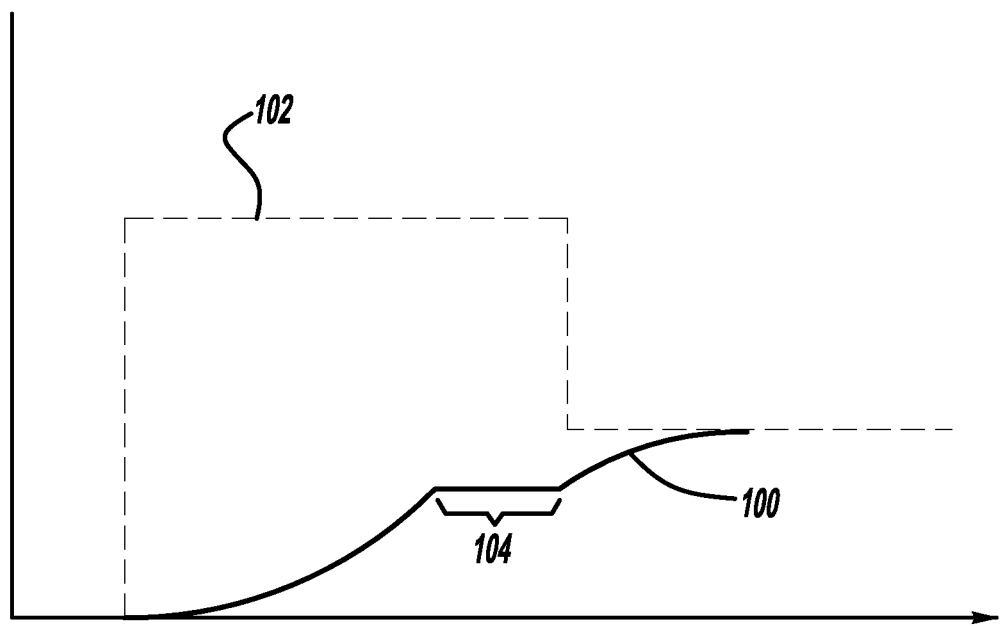
FIG. 4 is a graph with time on the x-axis and cathode catalytic heating flow on the y-axis illustrating a ramp schedule for hydrogen flow based on the determination of unexpected hydrogen flow.

FIG. 4 is also a graph with time on the x-axis and cathode catalytic heating flow request on the y-axis, where like elements are labeled with the same reference numerals as FIG. 3. In the example of FIG. 4, the valve flow estimation is not in an expected range, thus, the flow request for hydrogen through the valve 46 is adjusted down, as shown by the line 102, and the ramp schedule as determined at the box 70 of the algorithm 60 is also adjusted down, as can be seen by comparing the line 100 of FIGS. 3 and 4. Note that if the valve flow estimation error is severe enough, the request for hydrogen flow may be adjusted to zero. By adjusting the hydrogen flow set point to compensate for the detected error, the desired amount of heating can still be achieved without flowing excessive hydrogen to the cathode line 34.

As discussed above, the algorithm 60 described above does not determine which of the sensors 22 or 24 is inaccurate. To determine which sensor is reading incorrectly, a separate diagnostic may be used. For example, the separate diagnostic may actively command an exhaust backpressure valve to open and compare the cathode side pressure sensor 24 to ambient pressure, which may be measured or assumed. If the sensor 24 reads within an expected range, it may be inferred that the anode side pressure sensor 22 is reading incorrectly.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing a request for hydrogen flow from an anode subsystem to a cathode subsystem of a fuel cell system, said method comprising:
  receiving a request for the hydrogen flow from the anode subsystem to the cathode subsystem;
  providing a predetermined amount of the requested hydrogen flow from the anode subsystem to the cathode subsystem, said predetermined amount being less than the requested amount of hydrogen flow;
  determining an injector flow estimation for the hydrogen flowing through an injector to the anode subsystem;
  determining a valve flow estimation for the hydrogen flowing through a valve in a line that connects the anode subsystem to the cathode subsystem;
  calculating an error that is a difference between the injector flow estimation and the valve flow estimation; and
  completing the request for hydrogen flow by providing the entire amount of hydrogen that has been requested from the anode subsystem to the cathode subsystem if the calculated error is below a predetermined threshold, and adjusting the request for hydrogen flow if the calculated error is above the predetermined threshold.

2. The method according to claim 1 wherein determining a valve flow estimation for the hydrogen flowing through the valve includes measuring the pressure of the hydrogen in a line that is upstream of the valve and measuring the pressure of the hydrogen in the line that is downstream of the valve.

3. The method according to claim 2 wherein determining a valve flow estimation for the hydrogen flowing through the valve includes using the equation:

$$\dot{n}_{SubSonic} = \frac{P_{AnIn} \cdot A_{V_{lv}}}{\sqrt{MW_{AnOut}}} \sqrt{\left(\frac{2}{R(T_{coolIn})}\right)\left(\frac{k}{k-1}\right)\left[\left(\frac{P_{CaIn}}{P_{AnIn}}\right)^{2/k} - \left(\frac{P_{CaIn}}{P_{AnIn}}\right)^{k+1/k}\right]}$$

where $\dot{n}_{SubSonic}$ is a molar flow rate of hydrogen for subsonic flow, $P_{AnIn}$ is a pressure in an anode loop in kPa, i.e., an anode high side pressure, $A_{V_{lv}}$ is a cross-sectional area of the valve, $MW_{AnOut}$ is the molecular weight of an anode effluent gas (an equivalent that may be used for this term is the $k_v$ of the valve), R is the ideal gas constant (approximately 8.3144 kPa·L·mol$^{-1}$·K$^{-1}$), $T_{coolIn}$ is a temperature of a coolant at a coolant inlet to a fuel cell stack, k is a ratio of specific volume over specific heat (for hydrogen the specific volume over the specific heat value is 1.4), $P_{CaIn}$ is a pressure of a cathode inlet as measured by a pressure sensor in kPa, also known as a low side pressure.

4. The method according to claim 1 wherein determining an injector flow estimation for the hydrogen flowing through the injector includes using the equation:

$$\dot{n}_{InjSonic} = \frac{P_{AnInSply} \cdot A_{Inj} \cdot k_{InjAdptFx}}{\sqrt{MW_{Fuel}}} \sqrt{\left(\frac{k}{R \cdot (T_{Sply})}\right)\left(\frac{2}{k+1}\right)^{\frac{k+1}{k-1}}}$$

where $\dot{n}_{InjSonic}$ is a molar flow rate of hydrogen through the injector for subsonic flow, $P_{AnInSply}$ is a pressure of an anode input line upstream of the injector, $A_{Inj}$ is a cross-sectional area of the injector, $k_{InjAdptFx}$ is an adaptation factor to account for part to part variation and other unknowns of the injector, $MW_{Fuel}$ is the molecular weight of the hydrogen fuel, k is the ratio of specific volume over specific heat (for hydrogen this value is 1.4), R is the ideal gas constant (approximately 8.3144 kPa·L·mol$^{-1}$·K$^{-1}$), $T_{Sply}$ is a temperature of the hydrogen in the anode input line upstream of the injector.

5. The method according to claim 1 wherein adjusting the request for hydrogen flow if the calculated error is above a predetermined threshold includes controlling the pressure of the anode subsystem.

6. The method according to claim 1 wherein the valve provides hydrogen from the anode subsystem to the cathode subsystem so as to provide cathode catalytic heating of a fuel cell stack.

7. The method according to claim 1 wherein the amount of hydrogen that is the predetermined amount is an amount that is less than the requested amount.

8. A method for providing a cathode catalytic heating request for hydrogen flow from an anode subsystem to a cathode subsystem of a fuel cell system, said method comprising:
receiving a request for the cathode catalytic heating;
providing a predetermined amount of the hydrogen flow from the anode subsystem to the cathode subsystem necessary to fulfill the cathode catalytic heating request, said predetermined amount of hydrogen flow being less than the amount necessary to fulfill the cathode catalytic heating request;
determining an injector flow estimation for hydrogen flowing through an injector and into the anode subsystem;
determining a valve flow estimation for hydrogen flowing through a valve in a line that connects the anode subsystem to the cathode subsystem;
calculating an error that is a difference between the injector flow estimation and the valve flow estimation; and
completing the request for cathode catalytic heating by providing the entire amount of hydrogen that has been requested from the anode subsystem to the cathode subsystem for the cathode catalytic heating if the calculated error is below a predetermined threshold, and adjusting the hydrogen flow for the cathode catalytic request if the calculated error is above the predetermined threshold.

9. The method according to claim 8 wherein determining a valve flow estimation for the hydrogen flowing through the valve includes measuring the pressure of the hydrogen in a line that is upstream of the valve and measuring the pressure of the hydrogen in the line that is downstream of the valve.

10. The method according to claim 9 wherein determining a valve flow estimation for the hydrogen flowing through the valve includes using the equation:

$$\dot{n}_{SubSonic} = \frac{P_{AnIn} \cdot A_{V_{lv}}}{\sqrt{MW_{AnOut}}} \sqrt{\left(\frac{2}{R(T_{coolIn})}\right)\left(\frac{k}{k-1}\right)\left[\left(\frac{P_{CaIn}}{P_{AnIn}}\right)^{2/k} - \left(\frac{P_{CaIn}}{P_{AnIn}}\right)^{k+1/k}\right]}$$

where $\dot{n}_{SubSonic}$ is a molar flow rate of hydrogen for subsonic flow, $P_{AnIn}$ is a pressure in an anode loop in kPa, i.e., an anode high side pressure, $A_{V_{lv}}$ is a cross-sectional area of the valve, $MW_{AnOut}$ is the molecular weight of an anode effluent gas (an equivalent that may be used for this term is the $k_v$ of the valve), R is the ideal gas constant (approximately 8.3144 kPa·L·mol$^{-1}$·K$^{-1}$), $T_{coolIn}$ is a temperature of a coolant at a coolant inlet to a fuel cell stack, k is a ratio of specific volume over specific heat (for hydrogen the specific volume over the specific heat value is 1.4), $P_{CaIn}$ is a pressure of a cathode inlet as measured by a pressure sensor in kPa, also known as a low side pressure.

11. The method according to claim 8 wherein determining an injector flow estimation for the hydrogen flowing through the injector includes using the equation:

$$\dot{n}_{InjSonic} = \frac{P_{AnInSply} \cdot A_{Inj} \cdot k_{InjAdptFx}}{\sqrt{MW_{Fuel}}} \sqrt{\left(\frac{k}{R \cdot (T_{Sply})}\right)\left(\frac{2}{k+1}\right)^{\frac{k+1}{k-1}}}$$

where $\dot{n}_{InjSonic}$ is a molar flow rate of hydrogen through the injector for subsonic flow, $P_{AnInSply}$ is a pressure of an anode input line upstream of the injector, $A_{Inj}$ is a cross-sectional area of the injector, $k_{InjAdptFx}$ is an adaptation factor to account for part to part variation and other unknowns of the injector, $MW_{Fuel}$ is the molecular weight of the hydrogen fuel, k is the ratio of specific volume over specific heat (for hydrogen this value is 1.4), R is the ideal gas constant (approximately 8.3144 kPa·L·mol$^{-1}$·K$^{-1}$), $T_{Sply}$ is a temperature of the hydrogen in the anode input line upstream of the injector.

12. The method according to claim 8 wherein adjusting the flow of the hydrogen through the valve in the fuel cell system based on the calculated error includes controlling the pressure upstream of the valve.

13. The method according to claim 8 wherein the amount of hydrogen that is the predetermined amount of hydrogen flow necessary is less than the amount necessary to complete the cathode catalytic heating request.

14. The method according to claim 13 wherein the amount of hydrogen that is the predetermined amount is an amount that is the maximum amount provided until the error that is the difference between the injector flow estimation and the valve flow estimation is calculated.

15. A method for determining a flow of a gas through an injector and a flow of a gas through a valve in a fuel cell system, said method comprising:
   determining an injector flow estimation for the gas flowing through the injector;
   determining a valve flow estimation for the gas flowing through the valve;
   calculating an error that is a difference between the injector flow estimation and the valve flow estimation; and
   adjusting the flow of the gas through the valve in the fuel cell system based on the error, wherein the injector is located in an anode subsystem and the valve is located in a line that connects the anode subsystem to a cathode subsystem, and wherein the valve is used to provide a hydrogen gas from the anode subsystem to the cathode subsystem so as to provide cathode catalytic heating of a fuel cell stack.

16. The method according to claim 15 wherein determining a valve flow estimation for the gas flowing through the valve includes measuring a pressure of the gas in a line that is upstream of the valve and measuring a pressure of the gas in the line that is downstream of the valve.

17. The method according to claim 15 wherein adjusting the flow of the gas through the valve in the fuel cell system based on the calculated error includes controlling the pressure of the gas upstream of the valve.

18. The method according to claim 15 wherein the hydrogen gas that is provided to the cathode subsystem from the anode subsystem is limited until the error that is the difference between the injector flow estimation and the valve flow estimation is calculated.

* * * * *